United States Patent
Nagano

(10) Patent No.: US 10,215,950 B2
(45) Date of Patent: *Feb. 26, 2019

(54) HIGH-STRENGTH TITANIUM COPPER FOIL AND METHOD FOR PRODUCING SAME

(71) Applicant: JX Nippon Mining & Metals Corporation, Tokyo (JP)

(72) Inventor: Masayuki Nagano, Kanagawa (JP)

(73) Assignee: JX Nippon Mining & Metals Corporation, Tokyo (JP)

( * ) Notice: Subject to any disclaimer, the term of this patent is extended or adjusted under 35 U.S.C. 154(b) by 184 days.

This patent is subject to a terminal disclaimer.

(21) Appl. No.: 14/834,655

(22) Filed: Aug. 25, 2015

(65) Prior Publication Data

US 2016/0062074 A1 Mar. 3, 2016

(30) Foreign Application Priority Data

Aug. 29, 2014 (JP) ................................ 2014-176347

(51) Int. Cl.
| | | |
|---|---|---|
| G02B 7/02 | (2006.01) | |
| G02B 7/09 | (2006.01) | |
| C22F 1/08 | (2006.01) | |
| C22C 9/00 | (2006.01) | |
| G03B 3/10 | (2006.01) | |

(52) U.S. Cl.
CPC .............. G02B 7/026 (2013.01); C22C 9/00 (2013.01); C22F 1/08 (2013.01); G02B 7/09 (2013.01); G03B 3/10 (2013.01)

(58) Field of Classification Search
CPC .. C22C 9/00; G02B 7/09; G02B 7/026; G02B 7/08; G03B 3/10; C22F 1/08; Y10T 428/12431

USPC .................................. 359/676–706, 819–830
See application file for complete search history.

(56) References Cited

U.S. PATENT DOCUMENTS

| | | | | |
|---|---|---|---|---|
| 2004/0042928 A1* | 3/2004 | Sasaki | ........................ | C22F 1/08 420/485 |
| 2010/0276037 A1* | 11/2010 | Yamamoto | ................ | C22F 1/08 148/501 |
| 2016/0077303 A1* | 3/2016 | Ogino | ..................... | F16F 1/021 359/824 |

FOREIGN PATENT DOCUMENTS

| | | |
|---|---|---|
| JP | 6-264202 | 9/1994 |
| JP | 2004-176162 A | 6/2004 |
| JP | 2004-280031 A | 10/2004 |

(Continued)

OTHER PUBLICATIONS

Office Action in JP Application No. 2014-176347 dated Apr. 12, 2016, 3 pages.

(Continued)

*Primary Examiner* — Mahidere S Sahle

(74) *Attorney, Agent, or Firm* — Marshall, Gerstein & Borun LLP

(57) ABSTRACT

To provide a high-strength titanium-copper foil suitable as a conductive spring material that can be used in an electronic device component such as an autofocus camera module. A titanium copper foil containing Ti in an amount of 2.0 to 4.0 mass %, a remainder being copper and unavoidable impurities, said foil having a 0.2 % yield strength of 1200 MPa or more in both directions parallel and perpendicular to a rolling direction, and a spring limit value of 800 MPa or more in both directions parallel and perpendicular to the rolling direction.

10 Claims, 3 Drawing Sheets

(56) References Cited

FOREIGN PATENT DOCUMENTS

| JP | 2006/241573 A | 9/2006 |
|---|---|---|
| JP | 2009084592 A | 4/2009 |
| JP | 2009-115895 A | 5/2009 |
| JP | 2011/026635 A | 2/2011 |
| JP | 2014-037613 A | 2/2014 |
| JP | 2014-080670 A | 5/2014 |
| TW | 2014/10886 A | 3/2014 |
| TW | 2014/16465 | 5/2014 |
| WO | WO-2014/064970 A1 | 5/2014 |

OTHER PUBLICATIONS

Office Action in TW Application No. 104121103 dated Mar. 23, 2016, 8 pages.

\* cited by examiner

[Fig. 1]
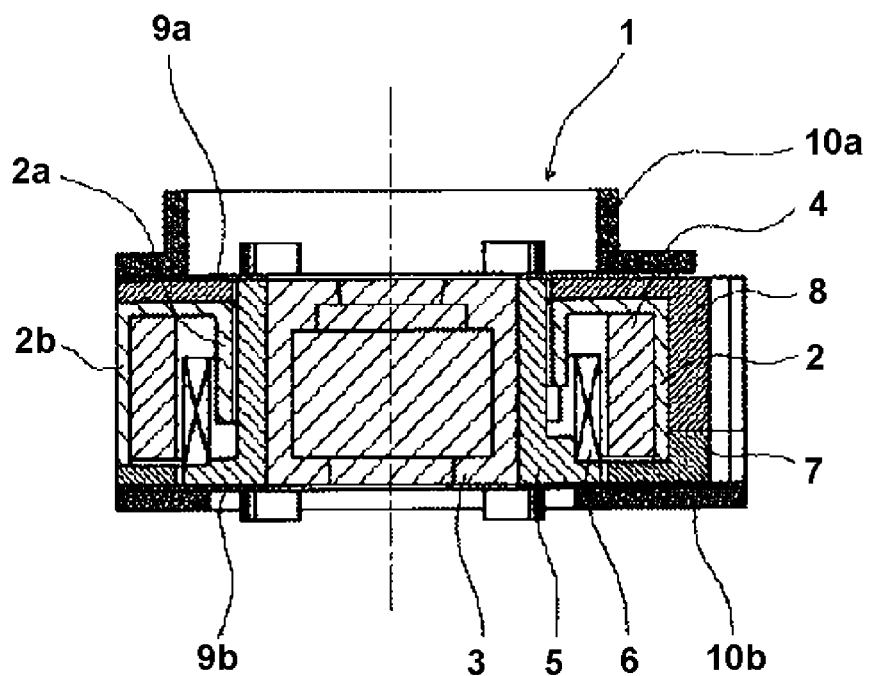

[Fig. 2]
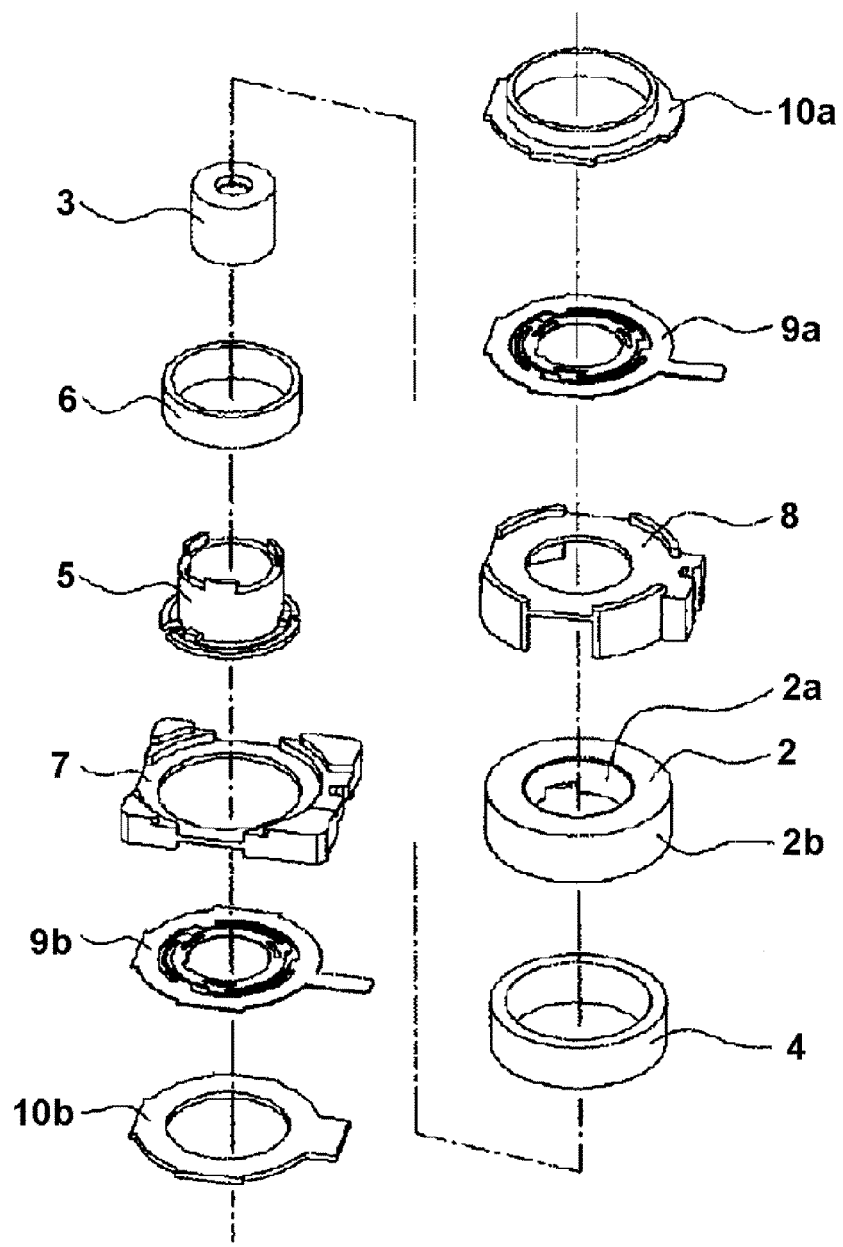

[Fig. 3]
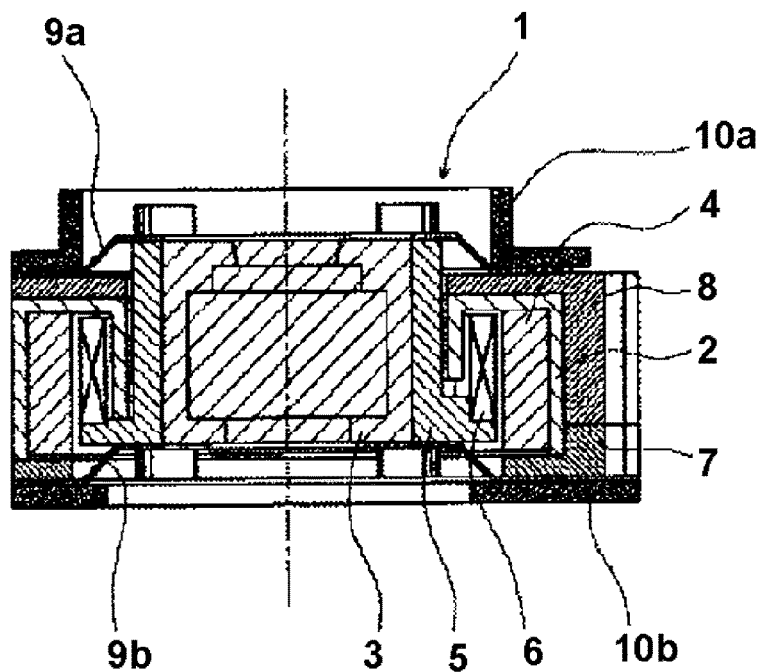
[Fig. 4]
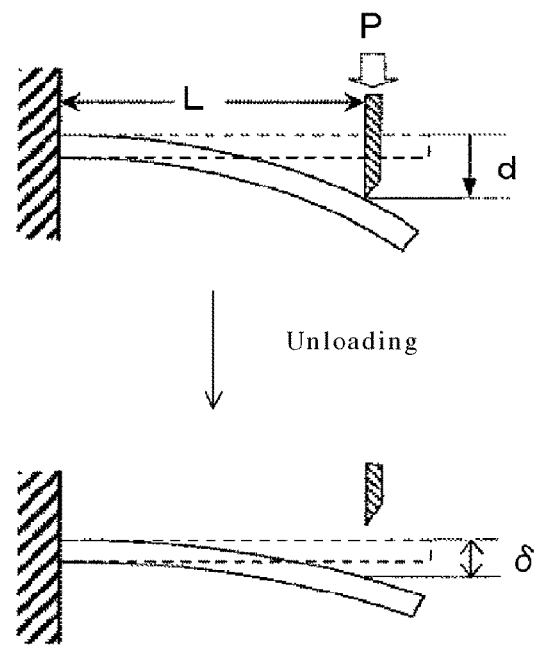

HIGH-STRENGTH TITANIUM COPPER FOIL AND METHOD FOR PRODUCING SAME

FIELD OF THE INVENTION

The present invention relates to a Cu—Ti based alloy foil having an excellent strength that is suitable as a conductive spring material used for an autofocus camera module, etc.

BACKGROUND TO THE INVENTION

An electronic component called an autofocus camera module is used in the camera lens part of a cellular phone. The autofocus function of the camera of the cellular phone unidirectionally moves the lens by the spring force of the material used in the autofocus camera module, and on the other hand, it moves the lens in a direction opposite to the direction in which the spring force of the material works, by an electromagnetic force generated by applying current to the coil wound around the periphery. Such a mechanism activates the camera lens thereby exhibiting the autofocus function (For example, Patent literatures 1 and 2).

Thus, the strength enough to withstand the material deformation caused by electromagnetic force is required in the copper alloy foil used in the autofocus camera module. If the strength is low, it will not be possible for the material to withstand the displacement caused by electromagnetic force thereby causing permanent deformation (settling). If settling occurs, it will not be possible to move the lens to a desired position when applying a certain current; and thus autofocus function is not exhibited.

The autofocus camera module uses a Cu—Ni—Sn based copper alloy foil having foil thickness of 0.1 mm or less and 0.2% yield strength of 1100 MPa or more. However, in response to the demand for recent cost cutting, a titanium copper foil whose material price is relatively cheaper than the Cu—Ni—Sn based copper alloy foil is being used and its demand is increasing.

On the other hand, the titanium copper foil has a lower strength than the Cu—Ni—Sn based copper alloy foil and causes a problem of settling; and therefore, higher strength is desired. To acquire a high strength titanium copper foil suitable for the autofocus camera module, various methods have been proposed. In Patent literature 3, the method of controlling surface roughness of the copper alloy foil by sequentially performing hot and cold rolling, and then solution treatment, cold rolling with 55% or more rolling reduction, aging at 200 to 450° C., and cold rolling with 35% or more rolling reduction; and in patent literature 4, the method of controlling $I_{(220)}/I_{(311)}$ by sequentially performing hot and cold rolling, solution treatment, cold rolling with 55% or more rolling reduction, aging at 200 to 450° C., cold rolling with 50% or more rolling reduction, and stress relief annealing as necessary to control the rolling reduction of cold rolling after solutionizing. Patent literatures 3 and 4 describes titanium copper foil which can achieve a 0.2% yield strength of 1100 MPa or more in the direction parallel to the rolling direction.

PRIOR ART LITERATURES

[Patent literature 1] Japanese Laid-Open Patent Publication No. 2004-280031
[Patent literature 2] Japanese Laid-Open Patent Publication No. 2009-115895
[Patent literature 3] Japanese Laid-Open Patent Publication No. 2014-037613
[Patent literature 4] Japanese Laid-Open Patent Publication No. 2014-080670

SUMMARY OF THE INVENTION

However, in association with the miniaturization of an autofocus camera module, in the prior art, settling occurs when the displacement applied to material is large; and therefore, further improvement is required.

Thus, the present invention aims to provide a high-strength titanium-copper foil that is more suitable as a conductive spring material that can be used in an electronic device component such as an autofocus camera module. Moreover, another objective of the present invention is to provide a method for producing such titanium copper foil.

The inventors of the present invention studied the relationship among the settling, the 0.2% yield strength and the spring limit value of the titanium copper foil in directions parallel and perpendicular to a rolling direction, and have found that the amount of settling becomes lower if the 0.2% yield strength as well as the spring limit value are higher in both directions. The present invention has been accomplished based on the background of the abovementioned findings, and is described below.

(1) A titanium copper foil containing Ti in an amount of 2.0 to 4.0 mass %, a remainder being copper and unavoidable impurities, said foil having a 0.2% yield strength of 1200 MPa or more in both directions parallel and perpendicular to a rolling direction and a spring limit value of 800 MPa or more in both directions parallel and perpendicular to the rolling direction.

(2) The titanium copper foil of (1), wherein it has a 0.2% yield strength of 1300 MPa or more in both directions parallel and perpendicular to the rolling direction.

(3) The titanium copper foil of (1) or (2), wherein it has a spring limit value of 1000 MPa or more in a direction perpendicular to the rolling direction.

(4) The titanium copper foil according to any one of (1) to (3), wherein a thickness of the foil is 0.1 mm or less.

(5) The titanium copper foil according to any one of (1) to (4), wherein it further contains one or more elements from among Ag, B, Co, Fe, Mg, Mn, Mo, Ni, P, Si, Cr and Zr in a total amount of 0 to 1.0 mass %.

(6) A method for producing titanium copper foil, comprising steps of:
making an ingot containing Ti in an amount of 2.0 to 4.0 mass %, a remainder being copper and unavoidable impurities;
sequentially performing hot and cold rolling on the ingot;
then performing a solution treatment for 5 seconds to 30 minutes at 700° C. to 1000° C.;
then performing cold rolling with 95% or more total rolling reduction;
then performing aging treatment in which a temperature is raised at a rate of 15° C./h or less and kept in a range of 200° C. to 400° C. for 1 to 20 hours, and cooling is then performed down to 150° C. at a rate of 15° C./h or less.

(7) The method for producing titanium copper foil according to (6), wherein the ingot further contains one or more elements from among Ag, B, Co, Fe, Mg, Mn, Mo, Ni, P, Si, Cr, and Zr in a total amount of 0 to 1.0 mass %.

(8) A wrought copper product provided with the titanium copper foil according to any one of (1) to (5).

(9) An electronic device component provided with the titanium copper foil according to any one of (1) to (5).

(10) The electronic device component according to (9) is an autofocus camera module.

(11) An autofocus camera module comprising a lens; a spring member for elastically biasing the lens toward an initial position in an optical axis direction, and an electromagnetic driving means capable of driving the lens in the optical axis direction by generating an electromagnetic force against the biasing force of the spring member, wherein the spring member is made of the titanium copper foil according to any one of (1) to (5).

A high strength Cu—Ti based alloy foil that is more suitable as a conductive spring material that can be used in an electronic device component such as an autofocus camera module can be obtained.

BRIEF DESCRIPTION OF THE DRAWINGS

FIG. 1 is a cross-sectional view showing an autofocus camera module according to the present invention.

FIG. 2 is an exploded perspective view of the autofocus camera module of FIG. 1.

FIG. 3 is a cross-sectional view showing an operation of the autofocus camera module of FIG. 1.

FIG. 4 is a schematic view showing a method for measuring an amount of settling.

MODE FOR CARRYING OUT THE INVENTION

The autofocus function of the lens of the autofocus camera module is exhibited by the spring force of the material installed on the lens and the displacement caused by electromagnetic force acting in opposite direction thereof. The displacement applied to the material is in the direction perpendicular to the rolling surface of the material therefore bending deformation is applied to the material. Thus, it is believed that the material is required to have not only a high 0.2% yield strength in a direction parallel to the rolling, but also a high 0.2% yield strength in a direction perpendicular to the rolling direction. Further, it is believed that a high spring limit value in both directions parallel and perpendicular to the rolling direction is also required.

(1) Ti Concentration

In the titanium copper foil according to the present invention, Ti concentration is set to be 2.0 to 4.0 mass %. In the titanium copper, a solid solution of Ti is formed in a Cu matrix by solution treatment and fine precipitates are dispersed into alloy by aging treatment thereby improving strength and conductivity.

If the Ti concentration is less than 2.0 mass %, there is insufficient precipitation of precipitates; and thus, the desired strength cannot be obtained. If Ti concentration exceeds 4.0 mass %, the workability is degraded and the material is likely to develop cracks at the time of rolling. Hence, considering the balance between the strength and the workability, Ti concentration is preferably 2.5 to 3.5 mass %.

(2) Other Additive Elements

In the titanium copper foil according to the present invention, the strength can be further improved by containing one or more kinds among Ag, B, Co, Fe, Mg, Mn, Mo, Ni, P, Si, Cr, and Zr in a total amount of 0 to 1.0 mass %. The total content of these elements may be 0, i.e., these elements may not be included. The upper limit of the total content of these elements was set to 1.0 mass %. This is because if the total content of these elements exceeds 1.0 mass %, the workability is degraded and the material is likely to develop cracks at the time of rolling. Hence, considering the balance between the strength and the workability, one or more kinds of the above elements are preferably contained in a total amount of 0.005 to 0.5 mass %.

(3) 0.2% Yield Strength

In the titanium copper foil according to the present invention, 1200 MPa or more can be achieved for 0.2% yield strength in both directions parallel and perpendicular to the rolling direction. 0.2% yield strength of 1200 MPa or more in both directions parallel and perpendicular to the rolling direction refers to a desirable characteristic for using as a conductive spring material of the autofocus camera module. 0.2% yield strength in both directions parallel and perpendicular to the rolling direction of the titanium copper foil according to the present invention is 1300 MPa or more in a preferred embodiment, 1400 MPa or more in a further preferred embodiment. Moreover, in a preferred embodiment of the titanium copper foil according to the present invention, 0.2% yield strength in a direction perpendicular to the rolling direction can be 1500 MPa or more and further 1600 MPa or more.

The upper limit of 0.2% yield strength is not particularly limited from a viewpoint of strength at which the present invention aims. However, it requires labor and cost; and therefore, 0.2% yield strength in both directions parallel and perpendicular to the rolling direction of the titanium copper foil according to the present invention is generally 2000 MPa or less and typically, 1800 MPa or less.

In the present invention, 0.2% yield strength in both directions parallel and perpendicular to the rolling direction of the titanium copper foil is measured on the basis of JIS Z2241:2011 (Metallic Materials Tensile Testing Method).

(4) Spring Limit Value

In the titanium copper foil according to the present invention, the spring limit value of 800 MPa or more in both directions parallel and perpendicular to the rolling direction can be achieved. The spring limit value of 800 MPa or more in both directions parallel and perpendicular to the rolling direction refers to an excellent resistance to settling, which is a desirable characteristic as a conductive spring material of the autofocus camera module. In the preferred embodiment of the titanium copper foil according to the present invention, the spring limit value of 900 MPa or more in both directions parallel and perpendicular to the rolling direction can be achieved, and further 1000 MPa or more can also be achieved. In a more preferred embodiment of the titanium copper foil according to the present invention, the spring limit value in the direction perpendicular to the rolling direction is 1000 MPa or more, more preferably 1200 MPa or more, more preferably 1400 MPa, more preferably 1600 MPa or more, and even more preferably 1700 MPa or more.

The upper limit of the spring limit value is not particularly limited from the viewpoint of strength at which the present invention aims. However, it requires labor and cost; and therefore, the spring limit value in both directions parallel and perpendicular to the rolling direction of the titanium copper foil according to the present invention is generally 2000 MPa or less and typically, 1900 MPa or less.

In the present invention, for the spring limit value of the titanium copper foil in the directions parallel and perpendicular to the rolling direction, an iterative deflection test is performed based on JIS: H3130:2012 (alloy number C1990) to determine the surface maximum stress from bending moment retaining a permanent strain.

(5) Thickness of the Copper Foil

In one embodiment of the titanium copper foil according to the present invention, the foil thickness is 0.1 mm or less, in a typical embodiment, the foil thickness is 0.08 to 0.01 mm, and in a more typical embodiment, the foil thickness is 0.05 to 0.02 mm.

(6) Production Method

A titanium copper foil according to the present invention can be produced by a method described below. In the production process of the titanium copper foil according to the present invention, firstly, the raw materials such as electrolytic copper and Ti are dissolved in a melting furnace to obtain a molten metal of a desired composition. The obtained molten metal is casted into an ingot. In order to prevent oxidation wear of the titanium, melting and casting are preferably performed under an inert gas atmosphere or in a vacuum. Thereafter, hot rolling, cold rolling 1, solution treatment, cold rolling 2, and aging treatment are sequentially performed to form a foil having desired thickness and characteristics.

The conditions for hot rolling and subsequent cold rolling 1 are satisfactory when performed under the customary conditions used in the production of the titanium copper; no conditions are otherwise required. Moreover, customary conditions can be used even for solution treatment; however, for example, it can be performed under the conditions at 700 to 1000° C. for 5 seconds to 30 minutes.

In order to obtain the above-mentioned strength, the rolling reduction of the cold rolling 2 is preferably set to 95% or more, more preferably 96% or more, and furthermore preferably 98% or more. If the rolling reduction is less than 95%, it becomes difficult to obtain 0.2% yield strength of 1200 MPa or more. The upper limit of the rolling reduction is not particularly provided from a viewpoint of settling resistance at which the present invention aims. However, industrially it does not exceed 99.8%. Note that, setting rolling reduction to 15 to 30% per 1 pass is preferable from a viewpoint of strength development.

In the aging treatment, the temperature is raised at a rate of 15° C./h or less, preferably 12° C./h or less, and more preferably 10° C./h or less up to a predetermined temperature in a range of 200 to 400° C., and is maintained in a range of 200° C. to 400° C. for 1 to 20 hours. While the material temperature is maintained in the range of 200° C. to 400° C., it is preferable to keep the temperature at a constant. However, since it does not have substantial impact, there is no problem even if the temperature changes if it is within ±20° C. from the set retention temperature. After heating is maintained, the cooling is performed down to 150° C. at a rate of 15° C./h or less, preferably 12° C./h or less, and more preferably 10° C./h or less. Setting the retention time to 1 hour or more at a predetermined temperature is to assure the strength development by age hardening. Moreover, setting the retention time to within 20 hours at a predetermined temperature is to prevent strength reduction by over aging. The retention time is preferably 1 to 18 hours, more preferably 2 to 15 hours.

If the temperature raising rate or the cooling rate exceeds 15° C./h, the compatibility between achieving 0.2% yield strength of 1200 MPa or more and achieving spring limit value of 800 MPa or more in both directions parallel and perpendicular to the rolling direction becomes difficult. Furthermore, if the retention temperature is less than 200° C. or exceeds 400° C., similarly, the compatibility between 0.2% yield strength of 1200 MPa or more and spring limit value of 800 MPa or more becomes difficult. If the retention time is less than 1 hour or exceeds 20 hours, similarly, the compatibility between 0.2% yield strength of 1200 MPa or more and spring limit value of 800 MPa or more becomes difficult.

The lower limit of the temperature raising and cooling rate is not particularly provided from a viewpoint of the spring limit value at which the present invention aims. However, if it is less than 5° C./h, the manufacturing cost increases, which is industrially not preferable. From the fact that the temperature raising and cooling rate of aging in the general industry is 20° C./h or more, the above-mentioned temperature raising and cooling rate was said to be considerably low.

Note that, the temperature raising rate is calculated based on a period for the temperature to raise from a heating start temperature up to a set temperature in a range of 200 to 400° C., and the cooling rate is calculated based on a period for the temperature to lower from a cooling start temperature down to 150° C.

If cold rolling is further performed after aging treatment, it is difficult to obtain spring limit value of 800 MPa or more. Even if stress relief annealing is performed thereafter, it is difficult to obtain a spring limit value of 800 MPa or more. Therefore, for producing titanium copper foil according to the present invention, none of cold rolling and stress relief annealing is preferably performed after aging treatment.

(7) Uses

The titanium copper foil according to the present invention can be suitably used as, but not limited to, the material for electronic device components such as switches, connectors, jacks, terminals, and relays. Especially it can be suitably used as a conductive spring material that can be used in electronic device components such as an autofocus camera module.

In one embodiment, the autofocus camera module comprises a lens, a spring member for elastically biasing the lens toward an initial position in the optical axis direction; and an electromagnetic driving means capable of driving the lens in the optical axis direction by generating an electromagnetic force against the biasing force of the spring member. The electromagnetic driving means, exemplary, can be provided with a U-shaped type cylindrical shape yoke, a coil housed inside the inner wall of the yoke, and a magnet housed inside the outer peripheral wall of the yoke as well as surrounding the coil.

FIG. 1 is a cross-sectional view showing an example of an autofocus camera module according to the present invention. FIG. 2 is an exploded perspective view of an autofocus camera module of FIG. 1. FIG. 3 is a cross-sectional view showing an operation of the autofocus camera module of FIG. 1.

The autofocus camera module 1 comprises a U-shaped type cylindrical shape yoke 2, a magnet 4 attached to the outer wall of the yoke 2, a carrier 5 provided with a lens 3 at the center position, a coil 6 mounted on the carrier 5, a base 7 to which yoke 2 is mounted, a frame 8 to support the base 7, two spring members 9a and 9b to support the carrier 5 at top and bottom, and two caps 10a and 10b covering these top and bottom. These two spring members 9a and 9b are the identical products, which support the carrier 5 across the top and bottom in the same positional relation as well as function as a power supply path to the coil 6. The carrier 5 is moved upward by applying current to the coil 6. Note that, in this specification, the words "top" and "bottom", which are used as appropriate, indicates top and bottom in FIG. 1, where "top" represents the positional relationship toward a subject from the camera.

The yoke 2 is a magnetic body of soft iron and the like. It is in a U-shaped type cylindrical shape, wherein an upper surface part is closed, and has a cylindrical inner wall 2a and outer wall 2b. On the inner surface of the U-shaped type outer wall 2b, a ring-shaped magnet 4 is attached (bonded).

The carrier 5 is a cylindrical structure product formed by synthetic resin and the like having a bottom surface part. It supports the lens at a center position, and a pre-formed coil 6 is mounted by bonding to an outside bottom surface. The yoke 2 is fitted and built-in in an inner periphery of the base 7 of the rectangular resin molded product. Further, the entire yoke 2 is fixed by the frame 8 of the resin molded product.

The outermost peripheral part of each spring member 9a and 9b is fixed by holding it between the frame 8 and the base 7, respectively, wherein the cutout groove part per 120° inner periphery is engaged to the carrier 5, and is fixed by thermal caulking and the like.

Between the spring member 9b and the base 7 and between the spring member 9a and the base 8, fixation is made by adhesive and thermal caulking and the like. In addition, the cap 10b is attached to the bottom surface of the base 7 and the cap 10a is attached to the upper part of the frame 8. The spring member 9b is inserted and fixed between the base 7 and the cap 10b and the spring member 9a is inserted and fixed between the frame 8 and the cap 10a.

The one lead wire of the coil 6 is extended upward through a groove provided in the inner periphery of the carrier 5 and soldered to the spring member 9a. The other lead wire is extended downward through a groove provided at the bottom surface of the carrier 5 and soldered to the spring member 9b.

Spring members 9a and 9b are a leaf spring of the titanium copper foil according to the present invention. They have spring characteristics and elastically bias the lens 3 toward an initial position in the optical axis direction. Simultaneously, it also acts as a power supply path to the coil 6. One position of the outer peripheral part of the spring member 9a and 9b is protruded outward to function as a power supply terminal.

A cylindrical magnet 4 is magnetized in a radial (diameter) direction to form a magnetic path through an inner wall 2a, an upper surface part, and an outer wall 2b of the U-shaped type yoke 2. The coil 6 is placed in the gap between the magnet 4 and the inner wall 2a.

Spring members 9a and 9b have same shape. As shown in FIGS. 1 and 2, they are attached in the same positional relation; and therefore, it is possible to suppress the axial displacement when the carrier 5 moves upward. The coil 6 is produced by pressure molding after winding; and therefore, the accuracy of the finishing outer diameter can be improved and it can be easily placed in the predetermined narrow gaps. The carrier 5 abuts the base 7 at the lowermost position and the yoke 2 at the uppermost position; and therefore has an abutting mechanism in the vertical direction; thereby preventing the fall off.

FIG. 3 shows a cross-sectional view when moving the carrier 5 upward by applying current to the coil 6, said carrier 5 having a lens 3 for autofocus. If voltage is applied to the power supply terminal of the spring members 9a and 9b, the current flows through the coil 6 and the electromagnetic force acts upward on the carrier 5. On the other hand, the restoring force of the linked 2 spring members 9a and 9b acts downward on the carrier 5. Thus, the movement distance of the carrier 5 in upward becomes the position where the electromagnetic force and the restoring force are balanced. Thus, the amount of movement of the carrier 5 can be determined by the amount of current applied to the coil 6.

The upper spring member 9a supports the upper surface of the carrier 5 and the lower spring member 9b supports the lower surface of the carrier 5; and therefore, the restoring force uniformly acts downward on the upper and lower surfaces of the carrier 5; thereby suppressing the axial displacement of the lens 3.

Therefore, during the upward movement of the carrier 5, guiding using a rib or the like is not required; hence, it is not used. Since there is no sliding friction by the guide, the amount of movement of the carrier 5 will be governed by simply balancing the electromagnetic force and the restoring force, thereby achieving smooth and accurate movement of the lens 3. Thus, the autofocus with less lens blurring is achieved.

Note that, the magnet 4 has been described as a cylindrical shape but it is not limited to this embodiment. It may be divided into three to four pieces and magnetized in a radial direction, which then may be fixed by pasting on the inner surface of the outer wall 2b of the yoke 2.

EXAMPLES

Hereinafter, the examples of the present invention are shown together with comparative examples. However, these examples are provided for better understanding of the present invention and the advantages thereof and it is not intended that the invention is limited.

Alloys each containing an alloy composition as shown in Table 1, the remainder of said alloy composition being copper and unavoidable impurities, were considered as experimental materials. The effect of alloy composition and manufacturing conditions on the 0.2% yield strength, spring limit value and settling was studied.

A 2.5 kg of electrolytic copper was dissolved in a vacuum melting furnace. Then, alloying elements were added such as to obtain the alloy composition described in Table 1. This molten metal was casted into a cast iron mold to produce an ingot having 30 mm thickness, 60 mm width, and 120 mm length. This ingot was processed in the order of following steps to prepare the product samples having a predetermined foil thickness described in Table 1.

(1) Hot rolling: The ingot was heated for 3 hours at 950° C. and rolled to a thickness of 10 mm.

(2) Grinding: The oxide scale generated by the hot rolling was removed by grinder. The thickness after grinding was 9 mm.

(3) Cold rolling 1: Rolling was performed to a predetermined thickness in accordance with the rolling reduction.

(4) Solution treatment: The sample was charged in an electric furnace where the temperature was raised to 800° C. After holding for 5 minutes, the samples were rapidly cooled by placing them into a water tank.

(5) Cold rolling 2: Rolling was performed to a foil thickness shown in Table 1. However, in regards to the samples for which rolling was not performed, "No" is described and in regards to the samples for which cold rolling 3 was performed, the rolling was performed to a predetermined thickness depending on the rolling reduction. Here, the rolling reduction per 1 pass was performed in a range of 15 to 30%.

(6) Aging treatment: Heating was performed in an Ar atmosphere under the conditions shown in Table 1.

(7) Cold rolling 3: Rolling was performed to a foil thickness shown in Table 1. In regards to the samples for which cold rolling 3 was not performed, "No" is described.

(8) Stress relief annealing: After performing cold rolling 3, the sample was charged into an electric furnace where the temperature was raised to 400° C. After holding for 10 seconds, the samples were rapidly cooled by placing them into a water tank. In Table 1, in regards to the samples for which the stress relief annealing was performed and not performed, "Yes" and "No" are described, respectively.

Following was evaluated for the prepared product samples.

(A) 0.2% Yield Strength

A tensile tester was used to measure 0.2% yield strength in the direction parallel and perpendicular to the rolling direction. This was measured in accordance with the measurement method described above.

(B) Spring Limit Value

A high-strength leaf spring testing machine was used to measure the spring limit value in the direction parallel and perpendicular to the rolling direction. This was measured in accordance with the measurement method described above.

(C) Settling

A strip sample having 12.5 mm width and 15 mm length was collected such that the longitudinal direction is parallel to the rolling direction. As shown in FIG. 4, one end of the sample was fixed.

At a distance L from the fixed end, a punch having a tip which was processed to a knife edge was pressed at a mobile speed of 1 mm/minute. Deflection of the distance d was imparted on the sample. Then, the punch was returned back to the initial position and was unloaded. After unloading, amount of settling δ was calculated.

When the foil thickness of the sample was 0.05 mm or less, the test conditions were as follows: L=3 mm, d=3 mm; and when the foil thickness was greater than 0.05 mm, the test conditions were as follows: L=5 mm, d=5 mm. Moreover, the amount of settling was measured at a resolution of 0.01 mm. When the settling was not detected, the result was represented as <0.01 mm. Note that the value of d was greater than the value in Patent literature 3; thus, the copper foil was easily subjected to settling.

Test results are shown in Table 2. In the inventive examples 1-29, which are within the specified range of the present invention, the 0.2% yield strength of 1200 MPa or more and the spring limit value of 800 MPa or more were obtained in both directions parallel and perpendicular to the rolling direction. The amount settling thereof was little, i.e. 0.1 mm or less; and thus, satisfactory characteristics were obtained.

In the comparative example 1, wherein the rolling reduction of the cold rolling 2 was less than 95%, the 0.2% yield strength was less than 1200 MPa, the spring limit value was less than 800 MPa, and the amount of settling exceeded 0.1 mm.

In the comparative examples 2 and 3, wherein the temperature raising rate of the aging treatment exceeds 15° C./h, the spring limit value in the direction parallel to the rolling direction was less than 800 MPa, and the amount of settling exceeded 0.1 mm.

In the comparative examples 4 and 5, wherein the temperature of the aging treatment was outside the range of 200 to 400° C., and in the comparative examples 6 and 7, wherein the time of the aging treatment was outside the range of 1 to 20 hours, the 0.2% yield strength was less than 1200 MPa or/and the spring limit value was less than 800 MPa, and the amount of settling exceeded 0.1 mm.

In the comparative examples 8 and 9, wherein the cooling rate of the aging treatment exceed 15° C./h, the spring limit value in the direction parallel to the rolling direction was less than 800 MPa and the amount of settling exceeded 0.1 mm.

In the comparative example 10, wherein the Ti concentration was less than 2.0 mass %, the 0.2% yield strength was less than 1200 MPa and the amount of settling exceed 0.1 mm. On the other hand, in the comparative example 11, wherein the Ti concentration exceeded 4.0 mass %, and in the comparative example 12, wherein the total amount of additive elements other than Ti exceeded 1.0 mass %, cracks were generated during rolling and evaluation could not be done.

Moreover, the comparative example 13 is an example in which the cold rolling was performed after the aging treatment, and the comparative example 14 is an example, wherein cold rolling and stress relief annealing were sequentially performed after aging treatment. In both, the 0.2% yield strength was less than 1200 MPa or/and the spring limit value was less than 800 MPa, and the amount of settling exceeded 0.1 mm.

The comparative example 15 is an example, wherein the cold rolling 2 was not performed, and the cold rolling was performed after aging treatment. The 0.2% yield strength was less than 1200 MPa, the spring limit value was less than 800 MPa, and the amount of settling exceeded 0.1 mm.

The comparative example 16 is an example, wherein both temperature raising and cooling rate of the aging treatment exceeded 15° C./h. The spring limit value in the direction parallel to the rolling direction was less than 800 MPa and the amount of settling exceeded 0.1 mm.

The comparative example 17 is an example, wherein the rolling reduction of the cold rolling 2 was less than 95%, both temperature raising and cooling rate of the aging treatment exceeded 15° C./h, and cold rolling and stress relief annealing were sequentially performed after aging treatment. The 0.2% yield strength was less than 1200 MPa, the spring limit value in the direction perpendicular to the rolling direction was less than 800 MPa and the amount of settling exceeded 0.1 mm.

The comparative examples 18 and 19 are an example, wherein both temperature raising and cooling rate of the aging treatment exceeded 15° C./h and the cold rolling was performed after the aging treatment. The spring limit value was less than 800 MPa and the amount of settling exceeded 0.1 mm.

TABLE 1

| | | Component conc. (mass %) | | Cold rolling 2 Rolling reduction | Aging treatment | | | | Cold rolling 3 Rolling reduction | Stress relief annealing | Foil thickness |
|---|---|---|---|---|---|---|---|---|---|---|---|
| | | | | | Temperature raising rate | Retention Temperature | Retention time | Cooling rate | | | |
| | No. | Ti | Others | (%) | (° C./h) | (° C.) | (h) | (° C./h) | (%) | | (mm) |
| Inventive Examples | 1 | 3.1 | None | 95 | 14 | 300 | 2 | 14 | No | No | 0.1 |
| | 2 | 3.1 | None | 96 | 14 | 300 | 2 | 14 | No | No | 0.08 |
| | 3 | 3.1 | None | 96.7 | 14 | 300 | 2 | 14 | No | No | 0.05 |
| | 4 | 3.1 | None | 97.3 | 14 | 300 | 2 | 14 | No | No | 0.04 |
| | 5 | 3.1 | None | 98 | 14 | 300 | 2 | 14 | No | No | 0.03 |

TABLE 1-continued

|  | No. | Component conc. (mass %) | | Cold rolling 2 Rolling reduction (%) | Aging treatment | | | | Cold rolling 3 Rolling reduction (%) | Stress relief annealing | Foil thickness (mm) |
|---|---|---|---|---|---|---|---|---|---|---|---|
|  |  | Ti | Others |  | Temperature raising rate (° C./h) | Retention Temperature (° C.) | Retention time (h) | Cooling rate (° C./h) |  |  |  |
|  | 6 | 3.1 | None | 98.7 | 14 | 300 | 2 | 14 | No | No | 0.02 |
|  | 7 | 3.2 | None | 98 | 8 | 300 | 2 | 14 | No | No | 0.03 |
|  | 8 | 3.2 | None | 98 | 10 | 300 | 2 | 14 | No | No | 0.03 |
|  | 9 | 3.2 | None | 98 | 15 | 300 | 2 | 14 | No | No | 0.03 |
|  | 10 | 3.2 | None | 98 | 14 | 200 | 2 | 14 | No | No | 0.04 |
|  | 11 | 3.2 | None | 98 | 14 | 300 | 2 | 14 | No | No | 0.04 |
|  | 12 | 3.2 | None | 98 | 14 | 400 | 2 | 14 | No | No | 0.04 |
|  | 13 | 3 | None | 98 | 14 | 300 | 1 | 14 | No | No | 0.04 |
|  | 14 | 3 | None | 98 | 14 | 300 | 15 | 14 | No | No | 0.04 |
|  | 15 | 3 | None | 98 | 14 | 300 | 20 | 14 | No | No | 0.04 |
|  | 16 | 3 | None | 98 | 14 | 300 | 2 | 8 | No | No | 0.04 |
|  | 17 | 3 | None | 98 | 14 | 300 | 2 | 10 | No | No | 0.04 |
|  | 18 | 3 | None | 98 | 14 | 300 | 2 | 15 | No | No | 0.04 |
|  | 19 | 2.2 | None | 98 | 14 | 300 | 2 | 14 | No | No | 0.03 |
|  | 20 | 2.8 | None | 98 | 14 | 300 | 2 | 14 | No | No | 0.03 |
|  | 21 | 3.8 | None | 98 | 14 | 300 | 2 | 14 | No | No | 0.03 |
|  | 23 | 3.2 | 0.2Fe | 96 | 14 | 300 | 2 | 14 | No | No | 0.03 |
|  | 24 | 3.2 | 0.2Fe | 98 | 14 | 300 | 2 | 14 | No | No | 0.03 |
|  | 25 | 3.2 | 0.3Cr | 98 | 14 | 300 | 2 | 14 | No | No | 0.03 |
|  | 26 | 3.2 | 0.1Ag, 0.1Co, 0.1Ni | 98 | 14 | 300 | 2 | 14 | No | No | 0.03 |
|  | 27 | 3.2 | 0.05Si, 0.1Ni, 0.1Zr, 0.1Mg | 98 | 14 | 300 | 2 | 14 | No | No | 0.03 |
|  | 28 | 3.2 | 0.05P, 0.1Ni, 0.05Mn | 98 | 14 | 300 | 2 | 14 | No | No | 0.03 |
|  | 29 | 3.2 | 0.05B, 0.5Mo, 0.4Cr | 98 | 14 | 300 | 2 | 14 | No | No | 0.03 |
| Comparative Examples | 1 | 3.1 | None | 94.7 | 14 | 300 | 2 | 14 | No | No | 0.08 |
|  | 2 | 3.2 | None | 98 | 17 | 300 | 2 | 14 | No | No | 0.03 |
|  | 3 | 3.2 | None | 98 | 20 | 300 | 2 | 14 | No | No | 0.03 |
|  | 4 | 3.2 | None | 98 | 14 | 180 | 2 | 14 | No | No | 0.04 |
|  | 5 | 3.2 | None | 98 | 14 | 420 | 2 | 14 | No | No | 0.04 |
|  | 6 | 3 | None | 98 | 14 | 300 | 0.5 | 14 | No | No | 0.04 |
|  | 7 | 3 | None | 98 | 14 | 300 | 22 | 14 | No | No | 0.04 |
|  | 8 | 3 | None | 98 | 14 | 300 | 2 | 17 | No | No | 0.04 |
|  | 9 | 3 | None | 98 | 14 | 300 | 2 | 20 | No | No | 0.04 |
|  | 10 | 1.8 | None | 98 | 14 | 300 | 2 | 14 | No | No | 0.03 |
|  | 11 | 4.2 | None | | Cracks caused by railing | | | | | | |
|  | 12 | 3.2 | 0.1Si, 0.2Ni, 0.5Zr, 0.5Mg | | Cracks caused by railing | | | | | | |
|  | 13 | 3.2 | None | 98 | 14 | 300 | 2 | 14 | 25 | No | 0.03 |
|  | 14 | 3.2 | None | 98 | 14 | 300 | 2 | 14 | 25 | Yes | 0.03 |
|  | 15 | 3.2 | None | No | 14 | 300 | 2 | 14 | 98 | No | 0.05 |
|  | 16 | 3.2 | None | 96 | 20 | 380 | 6 | 20 | No | No | 0.05 |
|  | 17 | 3.2 | None | 20 | 20 | 350 | 3 | 20 | 37.5 | Yes | 0.05 |
|  | 18 | 3.2 | None | 95 | 20 | 250 | 14 | 20 | 50 | No | 0.05 |
|  | 19 | 3.2 | None | 70 | 20 | 350 | 5 | 20 | 70 | No | 0.03 |

TABLE 2

|  | No. | 0.2% Yield Strength (MPa) | | Spring limit value (MPa) | | Settling amount (mm) |
|---|---|---|---|---|---|---|
|  |  | Parallel | Perpendicular | Parallel | Perpendicular |  |
| Inventive Examples | 1 | 1236 | 1289 | 811 | 862 | 0.10 |
|  | 2 | 1318 | 1357 | 851 | 1052 | 0.04 |
|  | 3 | 1332 | 1416 | 867 | 1163 | 0.04 |
|  | 4 | 1405 | 1496 | 890 | 1382 | <0.01 |
|  | 5 | 1452 | 1595 | 921 | 1527 | <0.01 |
|  | 6 | 1488 | 1628 | 923 | 1553 | <0.01 |
|  | 7 | 1448 | 1552 | 934 | 1532 | <0.01 |
|  | 8 | 1452 | 1571 | 931 | 1551 | <0.01 |
|  | 9 | 1435 | 1566 | 908 | 1468 | <0.01 |
|  | 10 | 1286 | 1368 | 883 | 1064 | 0.06 |
|  | 11 | 1443 | 1568 | 905 | 1463 | <0.01 |
|  | 12 | 1312 | 1396 | 886 | 1253 | 0.02 |
|  | 13 | 1246 | 1352 | 832 | 906 | 0.08 |

TABLE 2-continued

|  | No. | 0.2% Yield Strength (MPa) Parallel | 0.2% Yield Strength (MPa) Perpendicular | Spring limit value (MPa) Parallel | Spring limit value (MPa) Perpendicular | Settling amount (mm) |
|---|---|---|---|---|---|---|
|  | 14 | 1438 | 1638 | 905 | 1368 | <0.01 |
|  | 15 | 1468 | 1535 | 865 | 1362 | <0.01 |
|  | 16 | 1433 | 1566 | 916 | 1508 | <0.01 |
|  | 17 | 1457 | 1583 | 920 | 1489 | <0.01 |
|  | 18 | 1415 | 1528 | 876 | 1453 | <0.01 |
|  | 19 | 1286 | 1358 | 826 | 1064 | 0.04 |
|  | 20 | 1328 | 1422 | 886 | 1268 | <0.01 |
|  | 21 | 1481 | 1683 | 1021 | 1784 | <0.01 |
|  | 23 | 1355 | 1408 | 826 | 1106 | 0.04 |
|  | 24 | 1488 | 1620 | 924 | 1605 | <0.01 |
|  | 25 | 1483 | 1593 | 906 | 1583 | <0.01 |
|  | 26 | 1457 | 1621 | 901 | 1526 | <0.01 |
|  | 27 | 1438 | 1586 | 884 | 1543 | <0.01 |
|  | 28 | 1397 | 1537 | 916 | 1611 | <0.01 |
|  | 29 | 1386 | 1564 | 910 | 1480 | <0.01 |
| Comparative Examples | 1 | 1107 | 1138 | 705 | 722 | 0.18 |
|  | 2 | 1385 | 1486 | 785 | 1268 | 0.15 |
|  | 3 | 1258 | 1358 | 708 | 1053 | 0.15 |
|  | 4 | 1120 | 1255 | 753 | 785 | 0.20 |
|  | 5 | 1152 | 1085 | 713 | 968 | 0.15 |
|  | 6 | 911 | 904 | 685 | 719 | 0.53 |
|  | 7 | 1058 | 1162 | 728 | 885 | 0.21 |
|  | 8 | 1362 | 1408 | 758 | 1168 | 0.17 |
|  | 9 | 1266 | 1268 | 711 | 1067 | 0.17 |
|  | 10 | 868 | 1055 | 815 | 986 | 0.18 |
|  | 11 | Cracks caused by rolling | | | | |
|  | 12 | Cracks caused by rolling | | | | |
|  | 13 | 1351 | 1388 | 428 | 530 | 0.67 |
|  | 14 | 1237 | 1026 | 770 | 750 | 0.27 |
|  | 15 | 1051 | 1068 | 450 | 534 | 0.76 |
|  | 16 | 1215 | 1352 | 688 | 858 | 0.42 |
|  | 17 | 1075 | 954 | 850 | 750 | 0.33 |
|  | 18 | 1455 | 1532 | 443 | 568 | 0.54 |
|  | 19 | 1408 | 1555 | 440 | 622 | 0.42 |

REFERENCE NUMERALS

1 Autofocus camera module
2 Yoke
3 Lens
4 Magnet
5 Carrier
6 Coil
7 Base
8 Frame
9a Upper spring member
9b Lower spring member
10a, 10b Cap

What is claimed is:

1. A titanium copper foil containing Ti in an amount of 2.0 mass % to 4.0 mass %, optionally containing one or more elements selected from the group consisting of Ag, B, Co, Fe, Mg, Mn, Mo, Ni, P, Si, Cr, and Zr in a total amount of 0 mass % to 1.0 mass %, a remainder being copper and unavoidable impurities, said foil having a 0.2% yield strength of 1200 MPa or more in both directions parallel and perpendicular to a rolling direction, and a spring limit value of 800 MPa or more in both directions parallel and perpendicular to the rolling direction.

2. The titanium copper foil according to claim 1, having a 0.2% yield strength of 1300 MPa or more in both directions parallel and perpendicular to the rolling direction.

3. The titanium copper foil according to claim 1, having a spring limit value of 1000 MPa or more in a direction perpendicular to the rolling direction.

4. The titanium copper foil according to claim 1, wherein a thickness of the foil is 0.1 mm or less.

5. A method for producing titanium copper foil according to claim 1, comprising steps of:
   making an ingot containing Ti in an amount of 2.0 mass % to 4.0 mass %, optionally containing one or more elements selected from the group consisting of Ag, B, Co, Fe, Mg, Mn, Mo, Ni, P, Si, Cr, and Zr in a total amount of 0 mass % to 1.0 mass %, a remainder being copper and unavoidable impurities; sequentially performing hot and cold rolling on the ingot;
   then performing a solution treatment for 5 seconds to 30 minutes at 700° C. to 1000° C.;
   then performing cold rolling with 95% or more total rolling reduction;
   then performing aging treatment in which a temperature is raised at a rate of 15° C./h or less and kept in a range of 200° C. to 400° C. for 1 to 20 hours, and
   then performing cooling down to 150° C. at a rate of 15° C./h or less.

6. A wrought copper product provided with the titanium copper foil according to claim 1.

7. An electronic device component provided with the titanium copper foil according to claim 1.

8. The electronic device component according to claim 7, wherein the electronic device component is an autofocus camera module.

9. An autofocus camera module comprising:
   a lens,
   a spring member for elastically biasing the lens toward an initial position in an optical axis direction, and an electromagnetic driving means capable of driving the lens in the optical axis direction by generating an electromagnetic force against the biasing force of the spring member, wherein the spring member is made of the titanium copper foil according to claim 1.

10. The titanium copper foil according to claim 1, having a settling amount in a direction parallel to the rolling direction measured by a procedure described in the specification of 0.1 mm or less.

* * * * *